US011265809B2

(12) United States Patent
Jeong et al.

(10) Patent No.: US 11,265,809 B2
(45) Date of Patent: Mar. 1, 2022

(54) METHOD AND APPARATUS FOR SELECTING CORE NETWORK IN MOBILE COMMUNICATION SYSTEM

(71) Applicant: SK TELECOM CO., LTD., Seoul (KR)

(72) Inventors: Sangsoo Jeong, Seoul (KR); Jonghan Park, Seoul (KR); Yong-seok Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 16 days.

(21) Appl. No.: 16/793,882

(22) Filed: Feb. 18, 2020

(65) Prior Publication Data

US 2020/0187109 A1   Jun. 11, 2020

Related U.S. Application Data

(63) Continuation of application No. 15/985,110, filed on May 21, 2018, now Pat. No. 10,609,636, which is a
(Continued)

(30) Foreign Application Priority Data

Nov. 19, 2015   (KR) .................. 10-2015-0162790
Oct. 26, 2016   (KR) .................. 10-2016-0140378

(51) Int. Cl.
*H04W 48/18*    (2009.01)
*H04W 4/02*     (2018.01)
(Continued)

(52) U.S. Cl.
CPC ............ *H04W 48/18* (2013.01); *H04W 4/02* (2013.01); *H04W 8/02* (2013.01); *H04W 8/04* (2013.01);
(Continued)

(58) Field of Classification Search
CPC ......... H04W 8/20; H04W 8/04; H04W 48/18; H04W 60/04; H04W 4/02; H04W 8/02;
(Continued)

(56) References Cited

U.S. PATENT DOCUMENTS 8,588,143 B2    11/2013   Xiong
9,456,396 B2    9/2016    Liu et al.
(Continued)

FOREIGN PATENT DOCUMENTS

EP    2523505 A1    11/2012
EP    2866495 A2    4/2015
(Continued)

OTHER PUBLICATIONS

Solution for enhanced dedicated core network selection, SA WG2 Meeting #111, Huawei, Hi Silicon, Oct. 19-23, 2015, 10 Pages, Chengdu, China.
(Continued)

*Primary Examiner* — Brian D Nguyen
(74) *Attorney, Agent, or Firm* — Hauptman Ham, LLP

(57) ABSTRACT

A method and an apparatus for selecting a core network in a mobile communication system are disclosed. According to some aspects of the present disclosure, a method and apparatus are provided for selecting a core network which is appropriate to the type of user's subscribed service in a mobile communication system, without the need for re-routing.

5 Claims, 9 Drawing Sheets

Related U.S. Application Data continuation of application No. PCT/KR2016/012814, filed on Nov. 8, 2016.

(51) Int. Cl.
| | |
|---|---|
| *H04W 60/04* | (2009.01) |
| *H04W 64/00* | (2009.01) |
| *H04W 8/02* | (2009.01) |
| *H04W 8/04* | (2009.01) |
| *H04W 8/20* | (2009.01) |
| *H04W 8/24* | (2009.01) |
| *H04W 4/70* | (2018.01) |
| *H04W 84/04* | (2009.01) |
| *H04W 92/04* | (2009.01) |

(52) U.S. Cl.
CPC ............... *H04W 8/20* (2013.01); *H04W 8/24* (2013.01); *H04W 60/04* (2013.01); *H04W 64/003* (2013.01); *H04W 4/70* (2018.02); *H04W 84/042* (2013.01); *H04W 92/045* (2013.01)

(58) Field of Classification Search
CPC ..... H04W 64/003; H04W 48/08; H04W 8/24; H04W 92/045; H04W 4/70; H04W 84/042

See application file for complete search history.

(56) References Cited

U.S. PATENT DOCUMENTS

| | | | |
|---|---|---|---|
| 9,762,402 | B2 | 9/2017 | Batz et al. |
| 9,825,769 | B2 | 11/2017 | Batz et al. |
| 9,860,790 | B2 | 1/2018 | Khan et al. |
| 2012/0287854 | A1 | 11/2012 | Xie et al. |
| 2014/0211728 | A1 | 7/2014 | Zembutsu et al. |
| 2014/0301366 | A1 | 10/2014 | Guo |
| 2015/0098321 | A1 | 4/2015 | Jeong et al. |
| 2015/0312822 | A1 | 10/2015 | Bangolae et al. |
| 2015/0327133 | A1 | 11/2015 | Yiu et al. |
| 2016/0174120 | A1 | 6/2016 | Zembutsu et al. |
| 2016/0219476 | A1 | 7/2016 | Onishi et al. |
| 2017/0164317 | A1* | 6/2017 | Kuge .................... H04W 76/10 |
| 2017/0251103 | A1* | 8/2017 | Zembutsu ............... H04W 8/20 |
| 2017/0272921 | A1* | 9/2017 | Kim ........................ H04W 4/14 |
| 2018/0199262 | A1* | 7/2018 | Kuge .................... H04W 76/14 |
| 2018/0199278 | A1* | 7/2018 | Duan .................... H04W 48/18 |
| 2018/0310218 | A1* | 10/2018 | Chin .................... H04L 61/2007 |
| 2019/0069204 | A1* | 2/2019 | Zhang ..................... H04W 8/30 |
| 2020/0389827 | A1* | 12/2020 | Watfa ................. H04W 36/0055 |
| 2021/0014663 | A1* | 1/2021 | Ianev .................... H04W 48/18 |

FOREIGN PATENT DOCUMENTS

| | | |
|---|---|---|
| JP | 2018-526549 A | 9/2018 |
| JP | 2018538747 A | 12/2018 |
| KR | 10-1329686 B1 | 11/2013 |
| KR | 10-2015-0036584 A | 4/2015 |
| WO | 2017-036514 A1 | 3/2017 |
| WO | 2017081864 A1 | 5/2017 |

OTHER PUBLICATIONS

Selection of DCN, SA WG2 Meeting #111, Ericsson, Oct. 19-23, 2015, 6 Pages, Chengdu, P.R. China.

Chinese Office Action dated Jun. 22, 2020, in connection with the Chinese Patent Application No. 201680067157.3 citing the above reference(s).

International Search Report for PCT/KR2016/012814 dated Jan. 20, 2017, citing the above reference(s).

NEC, Dedicated Core Network (DCN) selection based on UE's inidcation to RAN, SA WG2 Meeting #111, Oct. 19-23, 2015, Chengdu, P.R. China.

Huawei, HiSilicon, Solution for enhanced dedicated core network selection, SA WG2 Meeting #111, Oct. 19-23, 2015, Chengdu, China.

Japanese Office Action dated May 9, 2019 in connection with counterpart Japanese Patent Application No. 2018-526501.

Extended European Search Report dated May 6, 2019 in connection with the counterpart European Patent Application No. EP16866599.0. citing the above reference(s).

Ericsson, Selection of CIoT DCN, SA WG2 Meeting #110-AH, Sophia Antipolis, France, Aug. 31-Sep. 3, 2015, 5 pages.

Japanese Office Action dated Feb. 2, 2021, in connection with the Japanese Patent Application No. 2018-526501 citing the above reference(s).

Huawei, Hisilicon, "Solution for enhanced dedicated core network selection," SA WG2 Meeting #110AH, Chengdu, China, Oct. 19-23, 2015, S2-153082, 9 Pages.

Japanese Office Action dated Aug. 17, 2021, in connection with the Japanese Patent Application No. 2018-526501 citing the above reference(s).

\* cited by examiner

METHOD AND APPARATUS FOR SELECTING CORE NETWORK IN MOBILE COMMUNICATION SYSTEM

CROSS-REFERENCE TO RELATED APPLICATION

The present application is a continuation of U.S. Pat. No. 10,609,636, filed May 21, 2018, which is a continuation of International Application No. PCT/KR2016/012814, filed Nov. 8, 2016, which is based upon and claims the benefit of priorities from Korean Patent Application Nos. 10-2015-0162790 and 10-2016-0140378, respectively filed on Nov. 19, 2015 and Oct. 26, 2016. The disclosures of the above-listed applications are hereby incorporated by reference herein in their entirety.

TECHNICAL FIELD

The present disclosure in some embodiments relates to a method and an apparatus for selecting a core network individually configured according to the type of service subscribed to by a user in a mobile communication system.

BACKGROUND

The statements in this section merely provide background information related to the present disclosure and do not necessarily constitute prior art.

A mobile communication carrier can separate and operate a core network for each service for the sake of easiness of system operation and QoS (quality of service) protection. For example, a mobile communication system may be composed of two core networks. One is a dedicated core network which is dedicated to a specific service (for example, Internet of Things or IoT), and the other is a common core network used commonly for all other services. Operating a core network separately in this manner enables to efficiently support different requirements for each device and user. However, when a user terminal (User Equipment: UE) connects or attaches to the network, an appropriate core network needs to be selected based on the subscription information of the user terminal.

FIG. 1 is a flowchart of a conventional core network selection process.

Specifically, FIG. 1 shows, as a technology introduced by the 3GPP Release 13 standard, selecting a service-specific core network by using the service information (usage type) included in the subscription information when the user terminal attaches to the network for the first time. When a terminal 10 attaches to the network (Step S110), a base station (eNodeB) 20 cannot select a service-specific core network due to lack of information on the terminal. The base station 20 first selects a basic core network determined according to the setting, and transmits an attach request message (S112). A core network node 'MME 1' 30a that has received this message sends a location update request message to a home subscriber server (HSS) 40 (S114), and receives, from the HSS 40, a user's subscribed service information (UE usage type) (S116). When the attached core network does not support the subscribed service, the 'MME 1' 30a selects another core network 'MME 2' 30b that supports the subscribed service (S118). Then, in order to re-direct the terminal to the other selected core network, the 'MME 1' 30a sends a NAS request message to the base station 20 (S120). The subsequent process is the same as the conventional location registration (attach/tracking area update (TAU)) process.

The conventional method of selecting a core network needs a base station to first attempt to attach a terminal to a preset default core network, and then re-direct the terminal device to another core network, resulting in two attempted attachments. This increases the time for attachment and overhead disadvantageously. In addition, the conventional method provides the user with only a default type of service when the relevant network is not able to support the user's subscribed service, which prohibits efficient use of resources and impedes the improvement of user's QoS. Part of the deficiencies lies in the fact that a mobility management entity (MME) determines to select the core network and that only one service type is permitted for a single user.

DISCLOSURE

Technical Problem

The present disclosure in some embodiments seeks to provide a method and apparatus for selecting an appropriate core network according to the type of user subscribed service without re-routing in selecting the core network in the mobile communication system.

SUMMARY

In accordance with some embodiments of the present disclosure, a base station apparatus for selecting a core network in a mobile communication system, includes a service information acquisition unit, a terminal identification information acquisition unit and a dedicated core network selection unit. The service information acquisition unit is configured to acquire a service information of a service to which a user subscribed from a service information database or a terminal device included in the mobile communication system. The terminal identification information acquisition unit is configured to acquire a terminal identification information from the terminal device upon acquiring the service information of the service to which the user subscribed or a service information for selecting a core network from the service information database. The dedicated core network selection unit is configured to select a dedicated core network to be used for providing a type of service to which the user subscribed, by using the service information acquired by the service information acquisition unit.

In accordance with another embodiment of the present disclosure, a terminal device for selecting a core network in a mobile communication system, includes a service information acquisition unit, a service information determining unit and a service information transmission unit. The service information acquisition unit is configured to acquire, when a location registration of the terminal device is successful, a service information of a service to which a user subscribed for a specific type of service, or a service information for selecting a core network, from a node of a dedicated core network dedicated to a specific service, and to store the service information. The service information determining unit is configured to determine whether the service information stored in the service information acquisition unit is valid. The service information transmission unit is configured to transmit the service information stored to a base station apparatus, when the service information stored in the service information acquisition unit is determined to be valid.

In accordance with yet another embodiment of the present disclosure, a terminal device for selecting a core network in a mobile communication system, includes a support service information acquisition unit, a service support/nonsupport confirmation unit and a service information transmission unit. The support service information acquisition unit is configured to acquire, in response to a location registration of the terminal device, a support service information which is information on a service supported by a dedicated core network, from a base station apparatus. The service support/nonsupport confirmation unit is configured to perform a service support/nonsupport confirmation by comparing the support service information with a prestored service information that is prestored in the terminal device and to confirm whether or not the dedicated core network supports a service to which a user subscribed. The service information transmission unit is configured to transmit the prestored service information to the base station apparatus when the service support/nonsupport confirmation unit confirms that the dedicated core network supports the service to which the user subscribed.

In accordance with some embodiments of the present disclosure, a method of operating a base station apparatus for selecting a core network in a mobile communication system, includes acquiring a service information of a service to which a user subscribed from a service information database or a terminal device included in the mobile communication system, and selecting a dedicated core network to be used for providing a type of service to which the user subscribed, by using the service information acquired by the acquiring of the service information.

In accordance with yet another embodiment of the present disclosure, a method of operating a terminal device for selecting a core network in a mobile communication system, includes acquiring, when a location registration of the terminal device is successful, a service information of a service to which a user subscribed for a specific type of service, or a service information for use when selecting the core network from a node of a dedicated core network dedicated to a specific service, and storing the service information, and determining whether the service information stored by the storing of the service information is valid, and transmitting, when the service information is determined to be valid, the service information stored by the storing of the service information to a base station apparatus.

In accordance with yet another embodiment of the present disclosure, a method of operating a terminal device for selecting a core network in a mobile communication system, includes acquiring, in response to a location registration of the terminal device, a support service information which is information on a service supported by a dedicated core network, or a service information for selecting a core network, from a base station apparatus, and performing a service support/nonsupport confirmation comprising (1) comparing the support service information with a prestored service information that is prestored in the terminal device, and (2) confirming whether or not the dedicated core network supports a service to which a user subscribed, and when the performing of the service support/nonsupport confirmation confirms that the dedicated core network supports the service to which the user subscribed, transmitting the prestored service information to the base station apparatus.

Advantageous Effects

As described above, according to some embodiments of the present disclosure, a method and apparatus are provided for selecting an appropriate core network according to the type of user subscribed service without re-routing in selecting the core network in the mobile communication system.

According to some embodiments of the present disclosure, a base station apparatus or base station directly selects the core network, thereby preventing the core network from being incorrectly selected.

According to some embodiments of the present disclosure, the user terminal device directly performs to select the core network, thereby further improving the scalability while solving the deficiencies of the prior art.

The present disclosure in some embodiments gives an advance notice of the type of service to be supported, thereby providing the user with better QoS while preventing increase in attachment time and message overhead due to incorrect selection of core network.

DETAILED DESCRIPTION

Hereinafter, some embodiments of the present disclosure will be described in detail using exemplary drawings. As used herein the terms ' . . . unit', 'module', and the like refer to a unit for processing at least one function or operation, which can be implemented by hardware, software, or a combination of hardware and software.

In order to clarify the explanation, the present embodiment is mainly concerned with a mobile communication system (Evolved Packet System or Long Term Evolution System) operating based on the 3GPP Release 13 and Release 14 standards evolved from 3GPP LTE or LTE-Advanced system, although the present disclosure is not limited thereto, and can be applied to the next generation mobile/wireless communication system based on another communication system.

Figure 1:
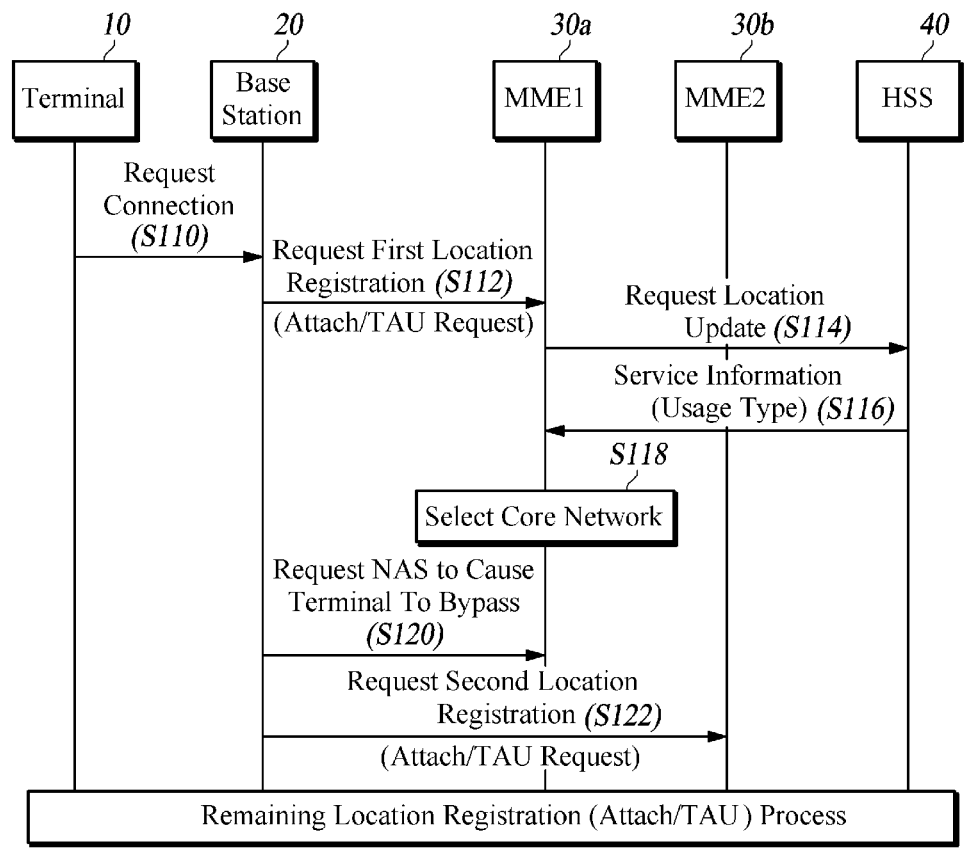
FIG. 1 is a flowchart of a conventional core network selection process.

As shown in the example of FIG. 1, the mobile communication system according to at least one embodiment of the present disclosure includes a terminal (user equipment: UE) 10, a base station (eNodeB) 20, at least one MME (mobility management entity) 30, and a home subscriber server (HSS)

40. In FIG. 1, only components related to the present embodiment are shown, and other components may be further included.

The terminal 10 is an electronic device having a communication function. For example, the terminal may include various electronic apparatuses including a tablet PC, a laptop, a personal computer (PC), a personal digital assistant (PDA), a portable multimedia player (PMP), a wireless communication terminal, a smartphone, a mobile communication terminal, a television, a digital video disk (DVD) player, an audio system, a refrigerator, an air conditioner, a game console, a set-top box, medical devices, measuring devices, and such various electronic apparatuses.

The base station 20 may provide an interworking function between the terminal 10 and the core network (evolved packet core: EPC). The core network includes a serving gateway (SGW, not shown), a packet data network gateway: PDN GW (PGW, not shown), the MME 30, and the HSS 40. The base station 20 may support, for example, one or more cells of GERAN, UTRAN, E-UTRAN, WB-E-UTRAN, NB-IoT and NR(New Radio).

The MME 30 is an element that performs signaling for supporting access to the network connection of the terminal 10, allocation of network resources, tracking, paging, roaming and handover, and that performs control functions. The MME 30 controls the functions of the control plane related to the subscriber and the session management. In addition, the MME 30 performs functions such as security procedures, terminal-to-network session handling), and idle terminal location management.

The HSS 40 stores subscription information, subscriber authentication, and profile. When the terminal 10 attaches to the network, the HSS 40 may transmit the subscription information of the relevant terminal 10 and the like to the MME 30.

Deficiencies of the prior art shown in FIG. 1, that is, an increase in attachment time due to two attempts of attachment, inefficient use of resources, a decrease in QoS, etc., may occur due to the following causes. First, the MME 30 is supposed to receive the subscription information directly from the HSS 40 for selecting the core network. Second, only one service type is permitted for a single user.

In order to solve the deficiencies of the prior art, some embodiments of the present disclosure provides a method for the base station 20 to directly select the core network. Hereinafter, a detailed description will be provided with reference to FIG. 2.

Figure 2:
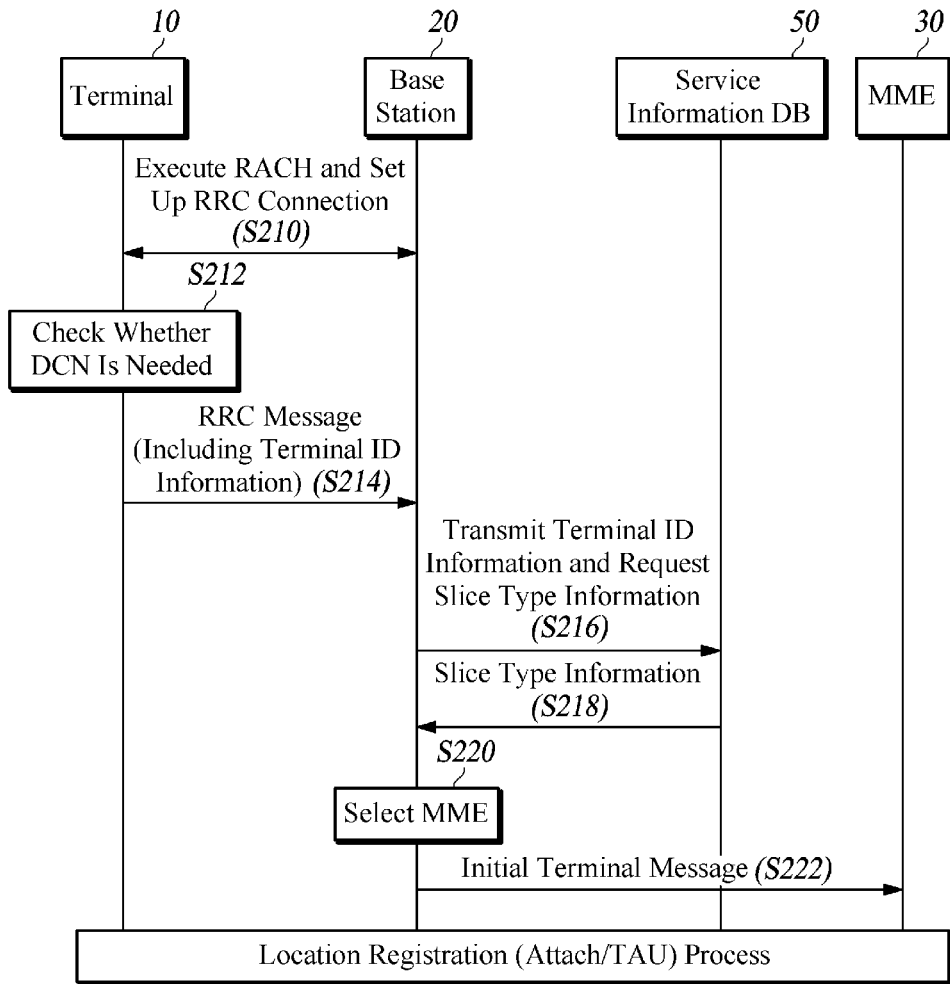
FIG. 2 is a flowchart of a process of selecting a core network by a base station according to at least one embodiment of the present disclosure.

FIG. 2 is a flowchart of a process, performed by a base station according to at least one embodiment of the present disclosure, for selecting a core network by using service information base station.

The MME 30 is a core network node, and therefore, for convenience of description, a method of selecting the MME 30 will be described below as an example method of selecting a core network according to some embodiments of the present disclosure. Thereafter, the method of selecting other nodes (e.g., SGW, PGW, etc.) of the core network may be performed by the MME using the received service information in the same manner as the base station selects the MME.

Referring to FIG. 2, in the present embodiment, the base station 20 may directly obtain the information for selecting the core network, i.e., the MME 30, so as not to cause re-routing. Here, the information for selecting the core network refers to the service information to which the user subscribed.

Specifically, the user's subscribed service information includes the conventional usage type and it has a broader concept, including "slice type information." A slice is a unit of network logically divided according to the purpose of use so as to satisfy specific needs depending on the user. This is a concept that assumes a network in which network slice technology is implemented.

Slice type information is information about the dedicated core network mapped to a particular service type (for example, including the core network identifier and the like). The slice type information may be stored in the user terminal by being allocated to the user terminal or being transferred from the core network node to the user terminal.

In the following description of this specification, the user's subscribed service information is to be understood as including slice type information, while a system using usage type is allowed to follow the usage type convention. For example, the service information may have a value that can identify a machine type communication (MTC) or Internet of Things (IoT) service, a mission critical service, a voice call service, a mobile broadband service (MBB), and the like.

Referring to FIG. 2, a mobile communication system according to embodiments of the present disclosure includes a service information database (DB) 50 in which the user's subscribed service information is stored. According to this embodiment, the service information DB 50 is linked to the base station 20, and thereby enables the service information DB 50 to receive the service information directly from the service information DB 50 for selecting the core network without involving the MME 30. The direct selection of the core network by the base station also improves the accuracy of selecting the core network.

When the terminal 10 first attaches to the base station 20 or when there is no radio resource for signal transmission, the terminal 10 may perform a random access procedure (RACH) for the base station 20 (Step S210). In addition, an initial process for radio resource control (RRC) connection setup is performed between the terminal 10 and the base station 20 (S210).

The terminal 10 confirms whether it is necessary to use a dedicated core network (DCN) (S212). Here, the dedicated core network refers to a core network that is utilized to provide a certain type of service, i.e., one of a plurality of services aforementioned with illustration, and it is contrasted with common core network.

When it is necessary to use a dedicated core network, the terminal 10 utilizes the RRC message in transmitting the identification information (e.g., IMSI) of the terminal 10 to the base station 20 with (S214).

The base station 20 attaches to the service information DB 50 to transmit the identification information of the terminal and to transmit a message for requesting the user's subscribed service information (e.g. slice type information) (S216). In response, the service information DB 50 provides the base station 20 with the service information mapped to the identification information of the terminal (S218).

Using the obtained service information, the base station 20 selects a dedicated core network (for example, MME) that is used for providing the user's subscribed type of service (S220). For example, the base station 20 may find the MME ID or MME Group Identifier (MMEGI) corresponding to part or all of the obtained slice type information. As another example, the base station 20 may select the MME by receiving MME information after making an MME inquiry to a separate server (for example, DSN: domain name system) with service information used as a parameter;

The base station 20 sends the selected MME 30 an initial UE message including a non-access stratum (NAS) message received from the terminal 10 (S222). The subsequent procedure is the same as the existing location registration (attach/tracking area update (TAU)) process.

In embodiments, the service information DB 50 may be implemented as a DB limited to providing service information for selecting a core network, or it may be implemented as a additional function added to an existing DB (for example, HSS or AM server) for storing user subscription information.

Although the embodiment shown in FIG. 2 can improve the accuracy of selecting the core network, it needs complementary measures since the identification information of the terminal is exposed to the base station and it is necessary to interlock the service information DB with a large number of base stations. An embodiment according to the present disclosure with the complementary measures will be described with reference to FIG. 3.

Figure 3:
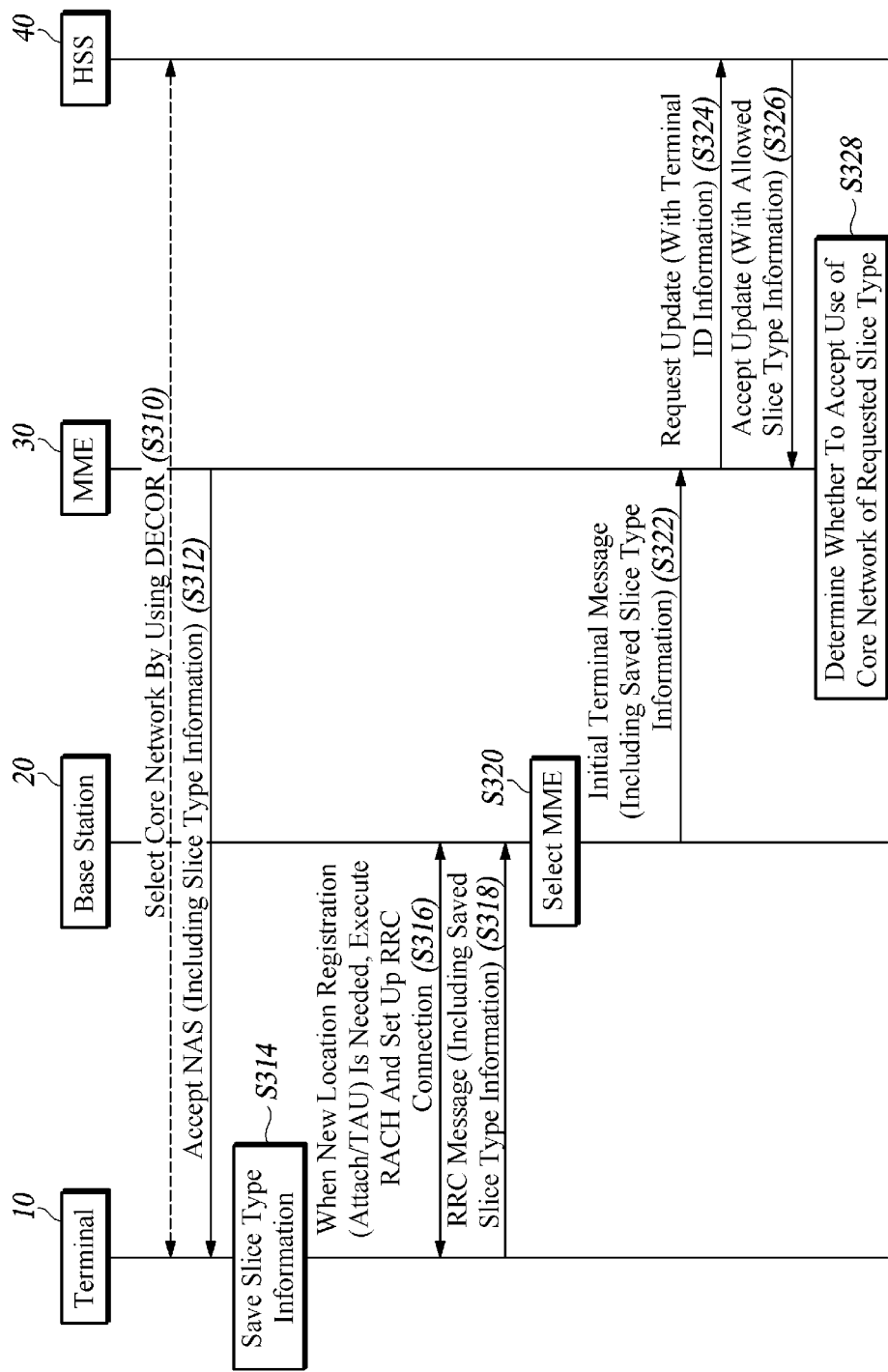
FIG. 3 is a flowchart of a process of selecting a core network by a base station according to another embodiment of the present disclosure.

FIG. 3 is a flowchart of a process of selecting a core network by a base station according to another embodiment of the present disclosure.

In the illustrated embodiment in FIG. 3, the terminal 10 directly obtains the user's subscribed service information, and the base station 20 selects the core network by using the service information that the terminal 10 obtained. In other words, the base station 20 may obtain the service information from the terminal 10 and use the obtained service information to select the dedicated core network mapped to the relevant service.

Specifically, a core network may be selected using a conventional technique (for example, DECOR; Dedicated Core Network) (S310). When the procedure is performed for attaching the terminal 10 to the selected core network (MME, 30) and the attachment is accepted, the MME 30 provides the user's subscribed service information through a NAS acceptance message (S312).

In Step S312, the MME 30 may directly deliver the subscribed service information (e.g., Network Slice Type, Usage Type, DCN-ID, etc.) received from the HSS 40 to the terminal 10. Alternatively, the MME 30 may transfer the service information to the terminal 10 in the form of other information (e.g., one or more MMEGIs) that can be used when selecting the MME. Here, the information Provided by the MME 30 may include not only information on the service type like the slice type information but also a validity timer indicating the time during which the service information is valid.

The terminal 10 stores service information (e.g., slice type information) acquired from the previously selected core network in a storage device (not shown) included in the terminal device (S314). Here, the service information may include not only information about the service type, such as slice type information, but also a validity timer indicating a time during which the service information is valid. Additional description of the valid timer will be given below with reference to other drawings.

When there is a need to select a new dedicated core network which is different from an existing core networks previously selected, the terminal 10 performs a random access process (RACH) with respect to the base station 20. An initial process for radio resource control (RRC) connection setup is performed between the terminal 10 and the base station 20 (S316). Thereafter, the terminal 10 transmits the stored service information to the base station 20 through the RRC message (S318). The service information transmitted from the terminal 10 to the base station 20 as described above is used by the base station 20 for selecting a new dedicated core network (S320).

FIG. 3 exemplifies the case where the base station can select a new MME according to the service information received from the terminal. The base station 10 newly selects the MME 30 and transmits the first terminal message including the NAS message to the selected MME 30 (S322). Here, the initial terminal message includes slice type information that the base station 20 received from the terminal 10, that is, service information. Alternatively, the service information may be directly transmitted after being included in the NAS message that the terminal 10 transmits to the MME 30.

Upon receiving the initial terminal message, the MME 30 sends the HSS 40 an Update Location Request message or Authentication Information Request including the terminal device identification information (e.g., IMSI) (S324). As a result, the HSS 40 extracts user's subscribed service information, i.e., slice type information permitted to the terminal 10, includes the extracted information in an update acceptance (Update Location Answer) message or Authentication Information Answer, and transmits the message with information to the MME 30 (S326).

The MME 30 may finally decides whether to accept the use of the slice type core network requested from the terminal 10 by using the slice type information received from the HSS 40 (S328). Step S328 is a process for preventing an error that may occur when a core network is selected only with the slice type information stored in the terminal 10. This can improve the accuracy of selection of the core network.

The embodiment illustrated in FIG. 3 generates no rerouting after the network attachment has occurred even once, but the initial network attachment, in which the service information is not transmitted from the terminal to the base station, may involve rerouting. Therefore, an embodiment according to the present disclosure with the complementary measures will be described with reference to FIG. 4.

Figure 4:
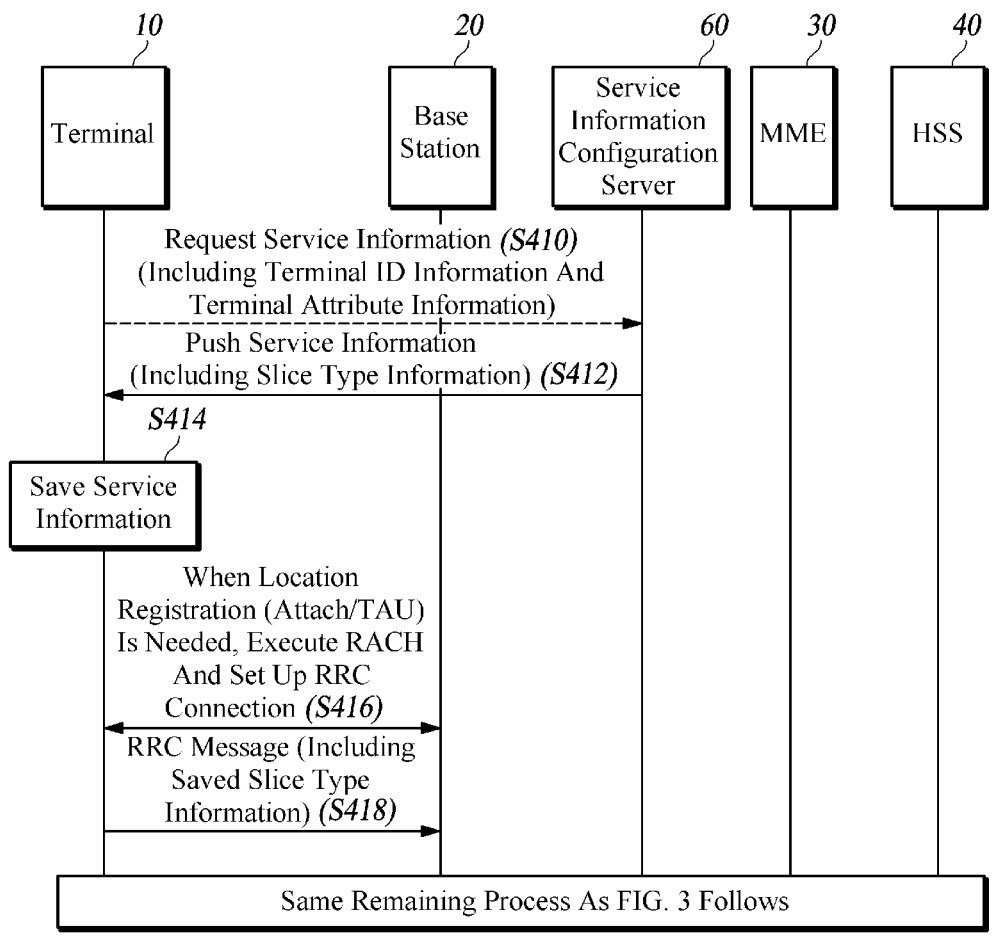
FIG. 4 is a flowchart of a process, performed by a base station according to at least one embodiment, for selecting a core network by using a separate server.

FIG. 4 is a flowchart of a process, performed by a base station according to at least one embodiment, for selecting a core network by using a separate server.

The embodiment of FIG. 4 can compensate the aforementioned deficiency by presetting the service information to the terminal 10 by using a separate server 60. FIG. 4 shows that the service information configuration server 60 exists as a separate unit in the mobile communication system, although not limited thereto. The server 60 may also be implemented along with another component into an integrated unit. For example, the service information configured by the service information configuration server 60 may be pre-configured at the time of manufacturing the terminal 10.

Referring to FIG. 4, the terminal 10 may send the server 60 a service information request message including identification information of the terminal 10, attribute information (e.g., low priority access) of the terminal 10, and the like (S410). Step S410 may be omitted according to the embodiment and is not an indispensable process.

The service information configuration server 60 configures service information suitable for the terminal 10, and transmits the configured service information to the terminal 10 through a Service Information Provisioning message (S412). Again, the service information similarly includes slice type information. Step S412 may be performed by using the Open Mobile Alliance-Device Management (OMA-DM) technology. In that case, the service information configuration server 60 may transmit the service information by using the NAS management object (MO).

The terminal 10 stores the service information acquired from the service information configuration server 60 (S414). Thereafter, when the location registration (Attach/TAU) is necessary, as described above, the terminal 10 performs a random access process (RACH) with respect to the base station 20. In addition, an initial process is performed for the RRC connection setting up between the terminal 10 and the base station 20 (S416). Here, cases where the location registration is needed may include where the terminal 10 deviates from the registered tracking area (TA), where the terminal 10 is out of the area or coverage of the operator (PLMN: Public Land Mobile Network Identity), where the radio access technology (RAT) in use needs to be changed, and when receiving a Detach command from the network, and the like.

The terminal 10 transmits the service information (e.g., slice type information) stored in the terminal 10 via the RRC message to the base station 20 (S418). Step S416 and Step S418 are the same as those described in FIG. 3, and the subsequent processes are also the same.

As described above, the conventional technology suffers from the deficiency that only one usage type is provided to the user, and when the subscribed usage type is unusable, the user is only allowed to receive the default service from the same operator. This deficiency is a factor that degrades the efficiency of use of the network when the network is shared or when the terminal can directly select one from two or more operators. This is true because, when the user is able to attach to both networks, e.g., operator A and operator B, it is effective to receive the QoS of a dedicated service by selecting operator B rather than receiving the default service from operator A.

Figure 5:
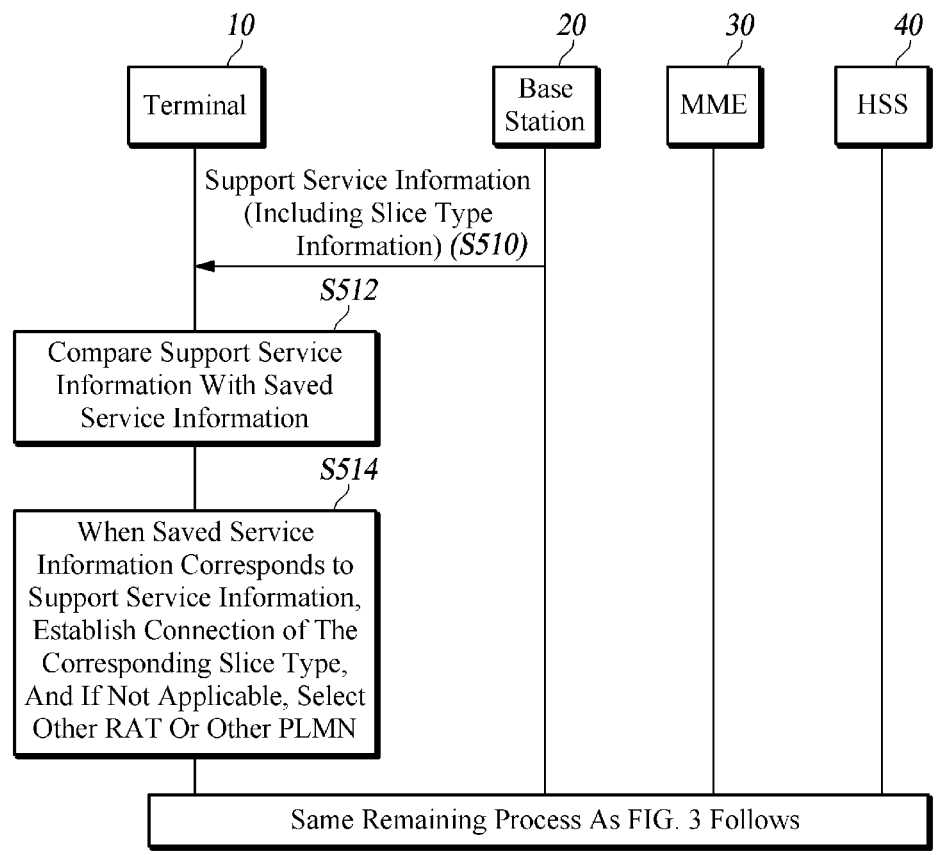
FIG. 5 is a flowchart of a process of selecting a core network by a terminal according to at least one embodiment of the present disclosure.

FIG. 5 is a flowchart of a process of selecting a core network by a terminal according to at least one embodiment of the present disclosure.

In this embodiment according to FIG. 5, information on services supported by the network is notified before the terminal 10 performs the authentication/attachment procedure, to avoid unnecessary service negotiation procedure. Further, if necessary, the terminal 10 may directly attach to another network that provides better service.

Specifically, referring to FIG. 5, the base station 20 transmits service information supported by a dedicated core network (hereinafter referred to as "support service information") connected to itself to the terminal 10 (S510). In Step S510, the base station 20 may broadcast a plurality of support service information via a system information block (SIB). In another embodiment, Step S510 may render the base station 20 to unicast a plurality of support service information via an RRC message.

In the case of the unicast method, the base station 20 may selectively configure the service information to be transmitted to the terminal 10 taking account of information provided by the terminal 10 (e.g., UE radio capability or device property, etc.). When the terminal 10, which has already received the broadcast support service information, attaches to a specific cell and receives the support service information through unicast, the terminal needs to preferentially apply the information received through the unicast while the terminal, attaches to that cell.

The support service information, may be set in the base station 20 using the OAM function. Alternatively, the support service information may also be acquired from MME 30 in the process the base station 20 performs the S1 setup procedure with the MME 30. More specifically, during the S1 setup procedure, MME can provide the service information including the supported services (DCN-IDs) to the base station.

Thereafter, the terminal 10 compares the support service information acquired from the base station 20 with the service information stored in the terminal 10 itself (S512). When the service information stored in the terminal 10 corresponds to the support service information, the terminal 10 attaches by the corresponding slice type, and if it does not correspond, the terminal 10 selects other radio access technology (RAT) or another operator (PLMN: Public Land Mobile Network Identity) (S514). During this process, the terminal 10 takes into consideration all of the priority by each slice type, the priority of RAT selection, and the priority of operator selection. Thereafter, the process of the core network attachment is the same as the process described above.

In this manner, the terminal 10 directly selects the core network, so that the scalability can be improved.

Figure 6:
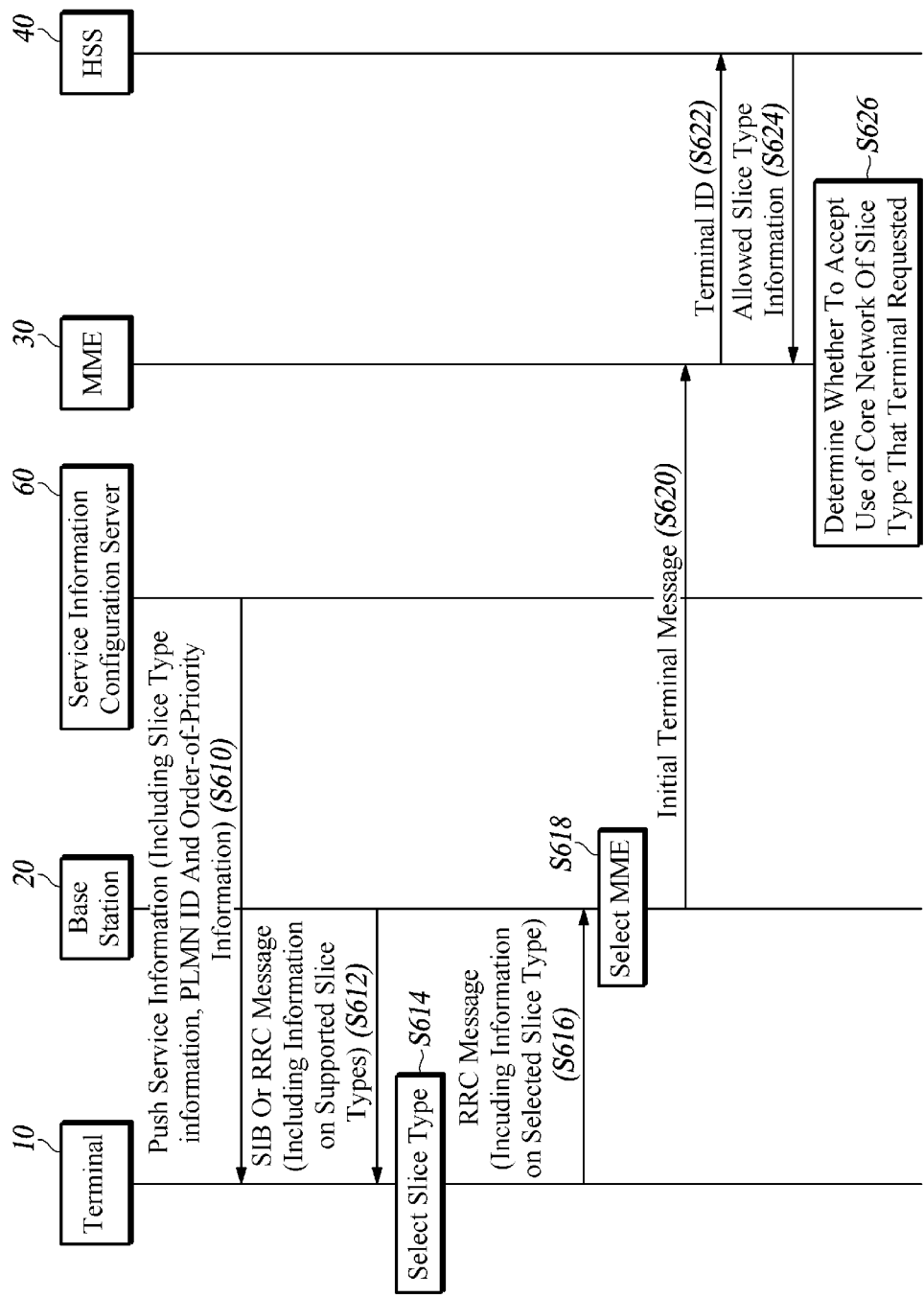
FIG. 6 is a flowchart of a process of selecting a core network by using service information according to at least one embodiment of the present disclosure.

FIG. 6 is a flowchart of a process of selecting a core network by using service information according to at least one embodiment of the present disclosure.

FIG. 6 shows an example in which the service information includes one or more of service type information applicable to the terminal 10, a valid timer indicating a time during which the service type information is valid, priority information, and PLMN identification information (PLMN ID), so as to allow a flexible selection of core network.

Specifically, the service information configuration server 60 may add not only slice type information but also PLMN identification information and priority order information to the service information to be provided to the terminal 10 (S610). For example, the configuration provided may be expressed as follows:

| PLMN ID X | slice type 1 | priority 1 |
|---|---|---|
| | slice type 2 | priority 2 |

As described above, the terminal 10 may acquire the support service information from the base station 20 through the SIB or the RRC message (S612). The terminal 10 may select the slice type of the cell to attach, by using the service information acquired from the service information configuration server 60 and the support service information (S614).

In Step S614, after collecting the cell information, the terminal may select, when selecting the cell to attach, the priority slice type having the highest priority among the slice types supported by attachable cells. In Step S614, the PLMN or RAT to which the terminal 10 attaches may be changed, and the terminal 10 may be provided with a timer to operate to prevent too frequent change. Specifically, when the terminal 10 begins to receive service from the selected certain slice type, it does not change the slice type until the timer expires except for inevitable situations such as going outside the network coverage.

Steps S618 to S626 of FIG. 6 are the same as the steps described above, and therefore the description thereof is omitted.

Hereinafter, with reference to FIG. 7 and FIG. 8, the operation of the terminal according to some embodiments of the present disclosure will be detailed.

Figure 7:
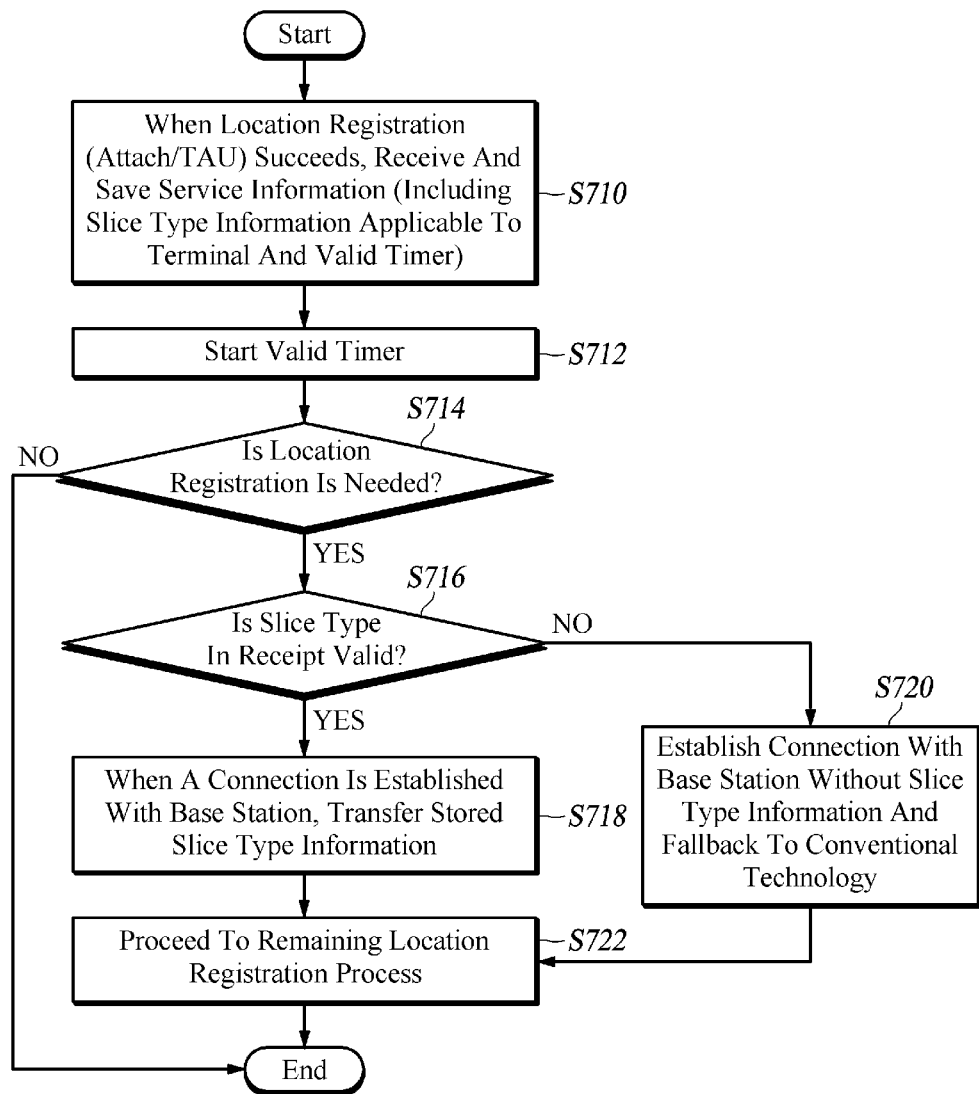
FIG. 7 is a flowchart of the operation of a terminal according to at least one embodiment of the present disclosure.

FIG. 7 is a flowchart of the operation of a terminal according to at, least one embodiment of the present disclosure.

Figure 8:
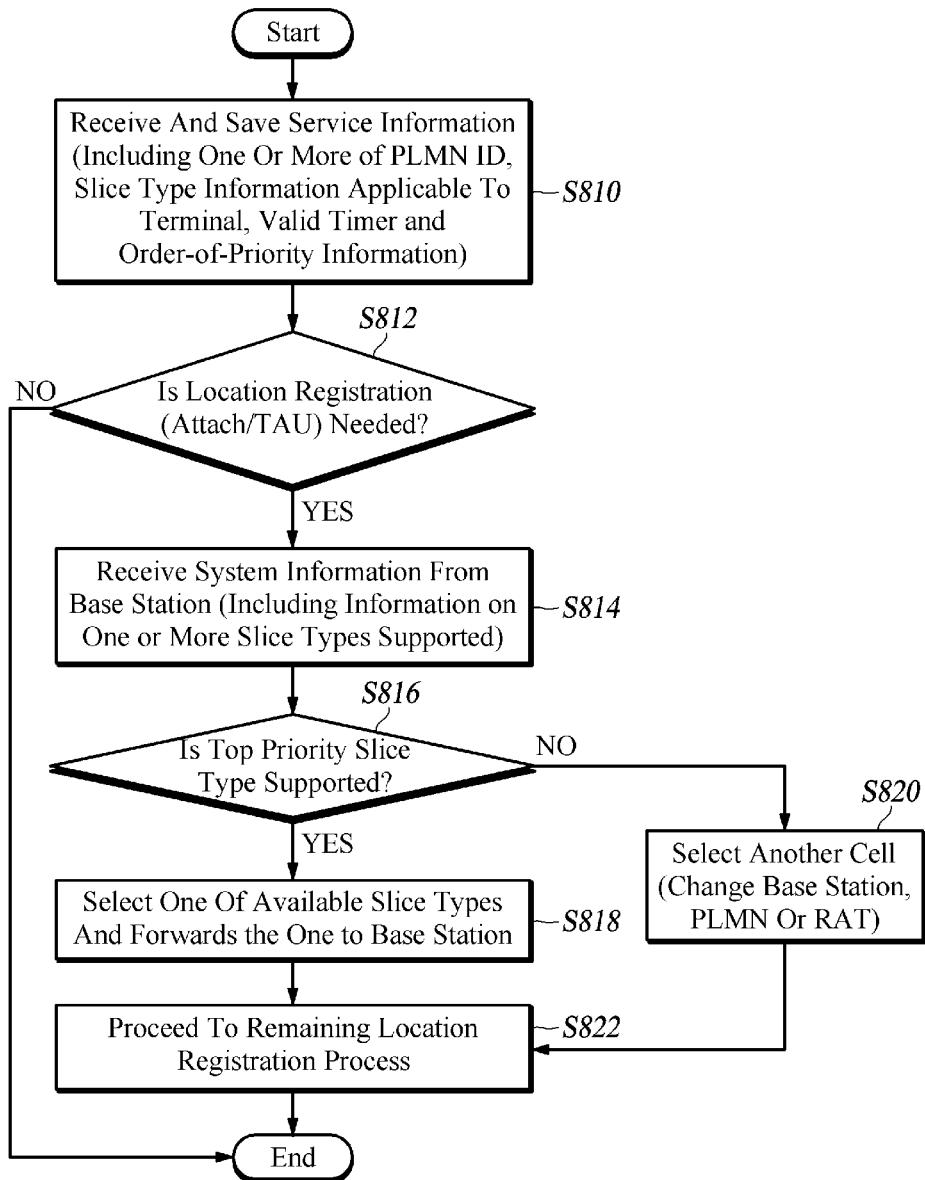
FIG. 8 is a flowchart of the operation of a terminal according to another embodiment of the present disclosure.

FIG. 8 is a flowchart of the operation of a terminal device according to another embodiment of the present disclosure.

First, the operation of the terminal device according to the embodiment shown in FIG. 7 will be described. When the location registration (Attach/TAU) of the terminal 10 succeeds, i.e., when the Attach/TAU acceptance message is received) with respect to the previously selected dedicated core network, the terminal 10 receives, from the node (e.g., MME) of the previously selected dedicated core network, the user's subscribed service information or the service information that is used when selecting the core network, and stores the received information (S710). Here, the service information may include service type information applicable to the terminal 10, and a valid timer indicating a valid time of the service type information. The service type information may also be called slice type information or dedicated core network identifier.

The terminal 10 in Step S712 is able to initiate an effective timer for the stored service type information if the service information includes the valid timer. When the valid timer expires, the service type information may be determined to be invalid.

Thereafter, when the location registration is needed again due to the movement or change in state of the terminal 10 (S714, Yes), the validity of the service information stored in the terminal 10 is determined (S716). Here, cases where the location registration is needed may include where the terminal 10 deviates from the registered tracking area (TA), where the terminal 10 is out of the area or coverage of the operator (PLMN), where the radio access technology (RAT) in use needs to be changed, and when receiving a Detach command from the network, etc.

For example, the service information received by the terminal 10 from the core network is valid only for the operator corresponding to the service information when it includes the PLMN information. Otherwise, when the service information does not contain the PLMN information in particular, the terminal 10 considers the received service information to be valid only for the registered PLMN.

Step S716 may include at least one of processes of (i) determining whether the existing dedicated core network previously attached has the same PLMN identification information as that of the new dedicated core network to attach, (ii) determining whether the terminal 10 does the location registration in a new area rather than the existing area where the previous registration occurred, and (iii) determining whether there is service information for which the valid timer has not expired among the pieces of service information stored in the terminal 10. Here, the new area may be one of a new tracking area (TA), a new routing area (RA) and a new public land mobile network (PLMN).

Upon determining that the stored service information is valid, the terminal 10 sends the base station 20 the stored service information that was received previously at the time of attachment of the base station 20 (S718). Specifically, the terminal 10 may include the service information to be transmitted in an RRC Connection Setup Complete message.

After Step S718, the terminal 10 performs the remaining processing of location registration (S722).

On the other hand, when the service information determination finds no valid service information, the terminal 10 operates using the conventional technology (e.g., 3GPP Rel-13 DECOR) (S720).

The following describes, with reference to FIG. 8, a method of operating the terminal according to another embodiment of the present disclosure.

The terminal 10 obtains and stores the service information (S810). Here, the service information may include at least one of service type information applicable to the terminal 10, a valid timer indicating a time during which the service type information is valid, priority information, and PLMN identification information.

In Step S810, the terminal 10 may obtain the service information from the node (e.g., MME, SGSN, etc.) of the previously attached dedicated core network. Further, the terminal 10 may utilize at least one of the identification information of the terminal 10 and the attribute information of the terminal 10, to obtain the service information from the service information configuration server 60 which configures service information suitable for the terminal 10. Depending on the embodiment, the service information may also be pre-configured in the terminal 10.

After Step S810, when the position registration is needed again due to the movement or the change of state of the terminal 10 (S812, Yes), the terminal 10 may receive, from the nearby base station 20, information on one or more supported services that are supported by the dedicated core network attached to the base device 20 (S814). Here, the support service information may be broadcasted by the base station 20 through a system information block (SIB). As another example, support service information may also be unicast through an RRC message. In the case of the unicast method, the base station 20 mat select the service information to be transmitted to the terminal 10 taking account of information provided by the terminal 10 (e.g., UE radio capability or device property, etc.).

The support service information may be set in the base station 20 by using the OAM function. Alternatively, it may be obtained from the MME 30 in the process of the base station 20 performing the procedure of S1 setup with the MME 30.

The terminal 10 compares the information of the one or more supported services with the service information stored in the terminal 10, and confirms whether the dedicated core network to which the terminal 10 previously attached supports the service subscribed by the user (S816). Specifically, the terminal 10 may compare the support service information and the stored service information based on the priority order information included in the service information. Upon comparison, the highest priority service information among the service information that matches the support service information, may be selected and passed to the base station (S818). At this time, the terminal 10 may include the highest priority service information in the RRC Connection Setup Complete message and transfer the resultant message to the base station 20. Thereafter, the terminal 10 performs the remaining procedure of location registration (S822).

In addition, when the comparison finds that the highest priority service information among the service information stored in the terminal 10 does not match the support service information (S816, NO), the terminal 10 may select a cell of another base station in order to select another dedicated core network that supports the highest priority service information (S820). Here, in order to select a cell of another base station, the terminal 10 may change the RAT, the base station or the PLMN.

Hereinafter, with reference to FIG. 9, terminal 10 and base station 20 according to some embodiments of the present disclosure will be described.

Figure 9:
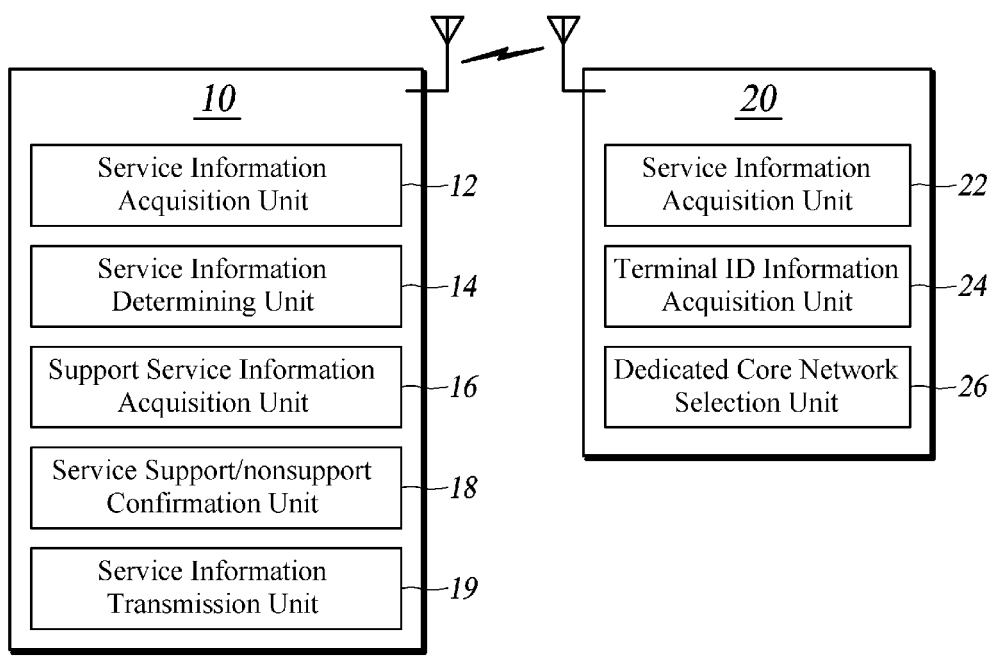
FIG. 9 is a schematic configuration diagram of a terminal and a base station according to at least one embodiment of the present disclosure.

FIG. 9 is a schematic configuration diagram of a terminal and a base station according to at least one embodiment of the present disclosure.

A base station 20 of a mobile communication system according to some embodiments includes a service information acquisition section 22, a terminal identification information acquisition section 24 and a dedicated core network selection section 26. FIG. 9 schematically shows the relevant components only, and in addition to the illustrated components, other general-purpose components may further be included. In addition, FIG. 9 shows that each component exists as a separate unit, although not limited thereto, and they may also be implemented in a single integrated device including all of the respective functions.

The service information acquisition unit 22 acquires the user's subscribed service information from a service information database (not shown) included in the mobile communication system or from the terminal 10.

In the case of acquiring the service information directly from the terminal 10, the service information may be pre-stored in the terminal 10 to be transmitted to the base station 20.

Specifically, when acquiring the service information from the service, information DB, where a dedicated core network needs to be used, the terminal 10 uses the RRC message to transmit the identification information of the terminal 10 (for example, IMSI) to the base station 20. The terminal identification information acquisition unit 24 acquires identification information of the terminal transmitted from the terminal 10.

The base station 20 attaches to the service information DB to transmit the identification information of the terminal, and transmits a message requesting the user's subscribed service information (e.g., slice type information). As a result, the service information acquisition unit 22 acquires, from the service information DB, the service information mapped to the identification information of the terminal.

Using the acquired service information, the dedicated core network selection unit 26 selects a dedicated core network (for example, MME) that is used for providing the user's subscribed type of service. For example, the dedicated core network selection unit 26 may search for the ID of the MME corresponding to some or all of the acquired slice type information, or an MME Group Identifier (MMEGI), or it may ask a separate server (e.g., DSN: Domain Name System or the like), and thereby selects the MME.

A terminal 10 according to some embodiments of the present disclosure includes a service information acquisition unit 12, a service information determining unit 14 and a service information transmission unit 19.

When the location registration of the terminal is successful with respect to the previously selected dedicated core network used for providing a specific type of service, the service information acquisition unit 12 acquires and stores the user's subscribed service information from the previously selected dedicated core network. Here, the service information may include service type information applicable to the terminal 10 and a valid timer indicating a time during which the service type information is valid.

When it is necessary to select a new dedicated core network, the service information determining unit 14 determines whether the stored service information in the service information acquisition unit 12 is valid.

The service information determining unit 14 may perform at least one of processes of (i) determining whether the new dedicated core network is the same as the previously selected dedicated core network, (ii) determining whether the terminal 10 registered at the time of acquiring the service information from the previously selected dedicated core network, has the same location as that of the terminal 10 to be registered in case of attaching to a new dedicated core network, and (iii) determining whether there is service information for which the valid timer has not expired among the pieces of service information stored in the terminal 10.

In other words, the service information determining unit 14 may determine at least one of (i) whether the existing dedicated core network previously attached has the same PLMN identification information as that of the new dedicated core network to attach, (ii) whether the terminal does the location registration in a new area rather than the existing area where the previous registration occurred, and (iii) whether or not the valid timer included in the service information expires.

The service information determined by the service information determining unit 14 may be reconfirmed as to its validity by the core network node which has received the location registration request message of the terminal 10.

Upon determining by the service information determining unit 14 that the stored service information from is valid, the service information transmission unit 19 transmits the stored service information in the service information acquisition unit 12 to the base station 20. Specifically, the terminal 10 may include the service information to be transmitted in an RRC Connection Setup Complete Message.

A terminal 10 according to another embodiment of the present disclosure includes a support service information acquisition unit 16 and a service support/nonsupport confirmation unit 18 in addition to the service information acquisition unit 12 and the service information transmission unit 19.

The service information acquisition unit 12 according to the present embodiment acquires and stores the user's subscribed service information. Here, the service information may include at least one of service type information applicable to the terminal 10, a valid timer indicating a time during which the service type information is valid, priority information, and PLMN identification information.

The supported service information acquisition unit 16 acquires, when there is a need for the location registration of the terminal 10, support service information which is information on the services supported by the dedicated core network, from the base station 20. Here, cases where the location registration is needed may include where the terminal 10 deviates from the TA, where the terminal 10 is out of the coverage or area of the operator (PLMN), where the RAT in use needs to be changed, and when receiving a Detach command from the network, and the like.

The service support/nonsupport confirmation unit 18 compares information on one or more of supported services with the service information stored in the service information acquisition unit 12, to confirm whether the existing dedicated core network that is previously attached supports the service to which the user subscribed. Here, the service information stored in the service information acquisition unit 12 (i.e., prestored service information) may be either acquired from an existing dedicated core network node that underwent a previous location registration or a separate server, or pre-configured in the terminal 10. The separate server may configure service information suitable for the terminal 10 by using at least one of identification information and attribute information of the terminal 10.

The service support/nonsupport confirmation unit 18 may compare the support service information and the prestored service information based on the priority order information included in the service information.

Based on the result of the comparison by the service support/nonsupport confirmation unit 18, the service information transmission unit 19 may select the highest priority service information among pieces of the prestored service information that match the support service information, and transmit the highest priority service information to the base station 20.

On the other hand, the terminal 10 may select a cell other than a cell of the base station 20, when the comparison by the service information confirmation section 18 indicates that the highest priority service information among the pieces of the prestored base information does not match the support service information, in order to select another dedicated core network that supports the highest priority service information.

FIGS. 1 to 8 are described as sequentially performing the respective steps, although they are not necessarily limited thereto. Specifically, various modifications are possible by changing the sequences illustrated in FIGS. 1 to 8, or by performing two or more of those steps in parallel, without departing from the gist and nature of the embodiments of the present disclosure, and hence the steps in FIGS. 1 to 8 are not limited to the illustrated chronological sequences.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the explicitly described above embodiments but by the claims and equivalents thereof.

INDUSTRIAL APPLICABILITY

As described above, the present disclosure in some embodiments is applied to a field of selecting a core network individually configured according to the type of service that a user subscribed to in the mobile communication system, and provides better QoS to the user while preventing an increase in attachment time and message overhead without the need for re-routing.

The invention claimed is:

1. A base station apparatus for selecting a core network in a mobile communication system, the base station apparatus comprising:
    a service information acquisition unit configured to obtain a service information to which a user subscribed from a terminal device; and
    a dedicated core network selection unit configured to select a dedicated core network for use in providing a type of service to which the user subscribed by using the service information obtained by the service information acquisition unit,
    wherein the base station apparatus sends the service information to the selected dedicated core network thereby the selected dedicated core network determines whether to accept a use of the selected dedicated core network by using the service information,
    wherein the selected dedicated core network sends a request message to a home subscriber server when the selected dedicated core network receives the service information from the base station apparatus, and
    wherein the selected dedicated core network receives an answer message including the service information which the user subscribed from the home subscriber server when the home subscriber server receives the request message from the selected dedicated core network.

2. The base station apparatus according to claim 1, wherein the service information is transmitted to the service information acquisition unit when the service information is determined to be valid by the terminal device.

3. The base station apparatus according to claim 2, wherein the terminal device is configured to determine at least one of:
    whether a previously accessed dedicated core network and a new dedicated core network to be accessed have a same PLMN identification information,
    whether or not a valid timer included in the service information expires, or
    whether the terminal device performs a location registration in a new area rather than an existing area where a previous registration occurred.

4. The base station apparatus according to claim 1, wherein the service information comprises:
    at least one of a service type information applicable to the terminal device,
    a valid timer indicating a time during which the service type information is valid, and
    a Public Land Mobile Network Identity (PLMN) identification information.

5. The base station apparatus according to claim 1, wherein the service information includes a dedicated core network identifier.

* * * * *